United States Patent
Pinarbasi

(10) Patent No.: US 7,155,810 B2
(45) Date of Patent: Jan. 2, 2007

(54) METHOD FOR FABRICATING A MAGNETIC HEAD

(75) Inventor: Mustafa Michael Pinarbasi, Morgan Hill, CA (US)

(73) Assignee: Hitachi Global Storage Technologies Netherlands, B.V., Amsterdam (NL)

(*) Notice: Subject to any disclaimer, the term of this patent is extended or adjusted under 35 U.S.C. 154(b) by 374 days.

(21) Appl. No.: 10/676,472

(22) Filed: Sep. 30, 2003

(65) Prior Publication Data

US 2005/0068697 A1    Mar. 31, 2005

(51) Int. Cl.
 G11B 5/127    (2006.01)
 H04R 31/00    (2006.01)

(52) U.S. Cl. .................. 29/603.16; 29/603.13; 29/603.14; 29/603.15; 29/603.18; 216/22; 216/48; 360/324.1; 360/324.11; 360/324.12; 360/316; 427/127; 427/128

(58) Field of Classification Search ............ 29/603.07, 29/603.13–603.16, 603.18; 360/324.1, 316, 360/324.11, 324.12; 427/127–131; 216/22, 216/48
See application file for complete search history.

(56) References Cited

U.S. PATENT DOCUMENTS

| 5,959,810 A * | 9/1999 | Kakihara et al. ......... 360/324.12 |
| 6,153,062 A * | 11/2000 | Saito et al. .............. 204/192.2 |
| 6,238,531 B1 | 5/2001 | Pinarbasi ................. 204/298.04 |
| 6,262,869 B1 | 7/2001 | Lin et al. ................ 360/324.11 |
| 6,353,318 B1 | 3/2002 | Sin et al. ..................... 324/252 |
| 6,417,999 B1 | 7/2002 | Knapp et al. ................ 360/322 |
| 6,421,212 B1 * | 7/2002 | Gibbons et al. ........ 360/327.31 |
| 6,434,814 B1 | 8/2002 | Chang et al. ............. 29/603.14 |
| 6,447,839 B1 | 9/2002 | Hegde et al. ................ 427/125 |
| 6,473,277 B1 | 10/2002 | Gill ........................... 360/319 |
| 2004/0047087 A1 * | 3/2004 | Fukui et al. ............ 360/324.12 |

FOREIGN PATENT DOCUMENTS

JP    11354860 A  *  12/1999

OTHER PUBLICATIONS

"Tunnel-valve and spin-valve structures with in situ in-stack bias"; childress, J.R.; Ho, M.; Fontana, R.E.; Rice, P.M.; Carey, M.J.; Gurney, B.A.; Tsang, C.; Magnetics Conference, 2002. INTERMAG Europe 2002; Apr. 28-May 2, 2002; p. CA8.*

* cited by examiner

Primary Examiner—Paul D. Kim
(74) Attorney, Agent, or Firm—Robert O. Guillot; Intellectual Property Law Offices

(57) ABSTRACT

A GMR read head for a magnetic head, in which the hard bias layers are fabricated immediately next to the side edges of the free magnetic layer, and such that the midplane of the hard bias layer and the midplane of the free magnetic layer are approximately coplanar. The positioning of the hard bias layer is achieved by depositing a thick hard bias seed layer, followed by an ion milling step is to remove seed layer sidewall deposits. Thereafter, the hard bias layer is deposited on top of the thick seed layer. Alternatively, a first portion of the hard bias seed layer is deposited, followed by an ion milling step to remove sidewall deposits. A thin second portion of the seed layer is next deposited, and the hard bias layer is then deposited.

6 Claims, 7 Drawing Sheets

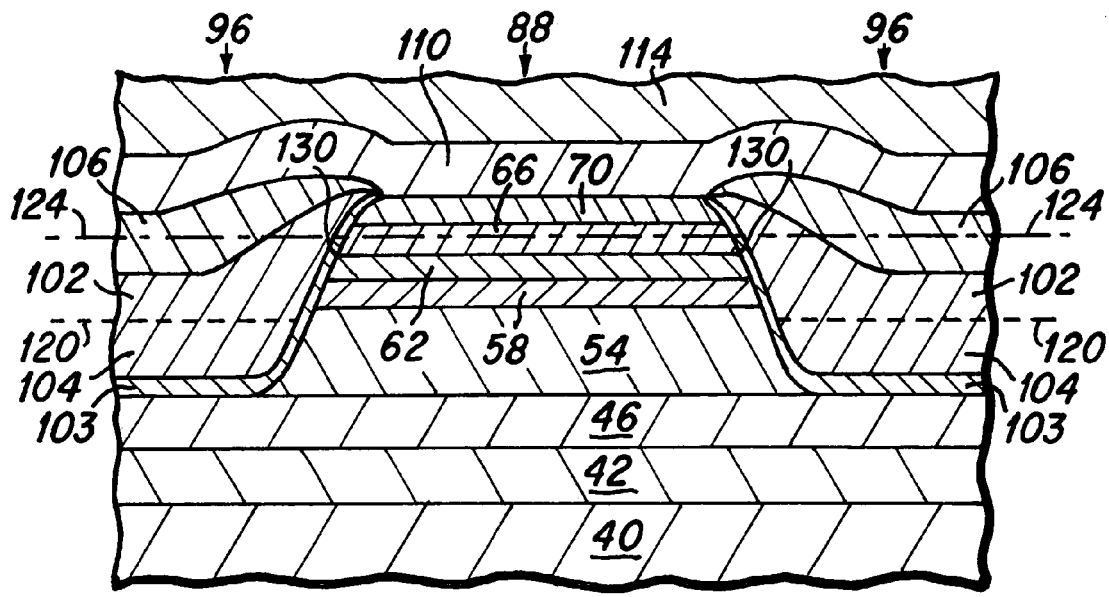
Fig. 3 *(PRIOR ART)*
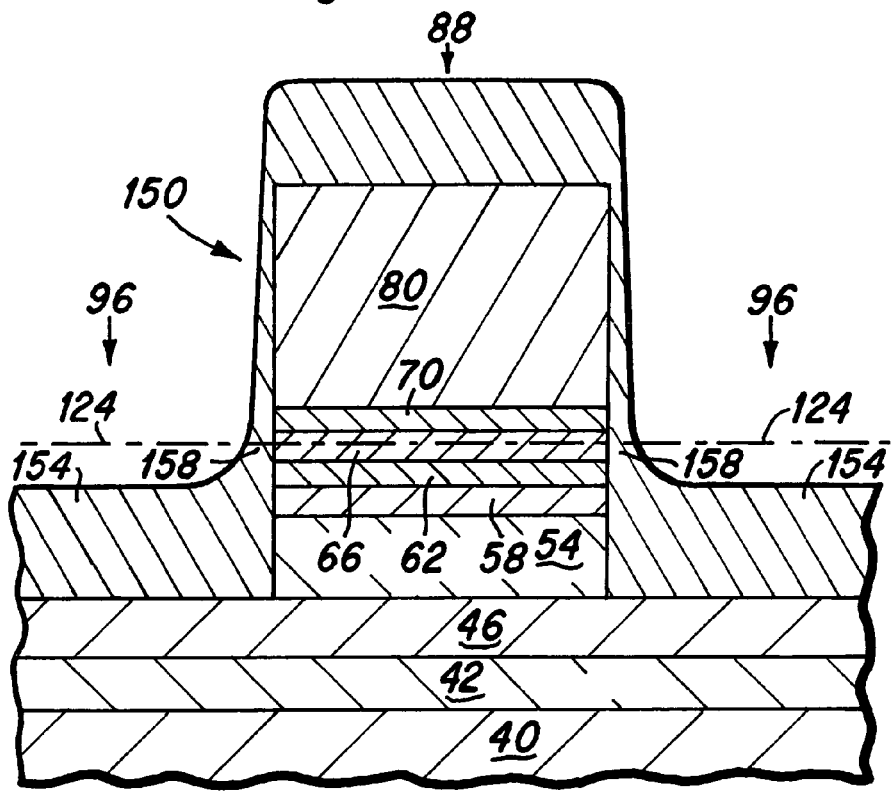
Fig. 4

METHOD FOR FABRICATING A MAGNETIC HEAD

BACKGROUND OF THE INVENTION

1. Field of the Invention

The present invention relates generally to a read head portion of a magnetic head for a hard disk drive, and more particularly to a giant magnetoresistance (GMR) read head including a free magnetic layer with closely spaced, horizontally aligned hard bias elements in two side regions.

2. Description of the Prior Art

In a commonly used giant magnetoresistance (GMR) read head, a GMR read sensor is located in a central read region, while a hard bias layer and electrical contacts are located in each of two side regions. The GMR read sensor typically includes nonmagnetic seed layers, an antiferromagnetic pinning layer, ferromagnetic pinned layers, a nonmagnetic spacer layer, a ferromagnetic free layer, and a nonmagnetic cap layer. The hard bias layer typically includes a seed layer and a magnetic hard bias layer. The electrical contacts typically comprise highly electrically conducting nonmagnetic layers.

The hard bias layer must exhibit a high coercivity and thus provide a magnetic biasing field for stabilizing the free magnetic layer. This stabilization is the most effective when the midplane of the hard bias layer is located at the same horizontal level as the midplane of the free magnetic layer. In the prior art head fabrication process, however, the hard bias layer is typically deposited on an $Al_2O_3$ bottom gap layer in the side regions, and thus the midplane of the hard bias layer is typically located at a horizontal level significantly lower than the midplane of the free magnetic layer. As a result, it is difficult to stabilize the free magnetic layer. In an effort to raise the hard bias layer, a thickened seed layer has been deposited beneath it. However, the deposition of such a thickened seed layer results in thick sidewall deposition upon the central sensor layers, thus creating an unwanted separation between the side edges of the free magnetic layer and the hard bias elements. Minimizing this separation is important to improve magnetic head performance.

There is therefore a need for a head fabrication process in which the hard bias elements are fabricated as close as possible to the free magnetic layer, and wherein the midplane of the hard bias layer can be located at the same horizontal level as the midplane of the free magnetic layer, so that the most effective stabilization of the free magnetic layer can be obtained.

SUMMARY OF THE INVENTION

The present invention is an improved GMR read head for a hard disk drive, in which the hard bias layers are fabricated next to the side edges of the free magnetic layer, such that the midplane of the hard bias layer and the midplane of the free magnetic layer are approximately coplanar. The positioning of the hard bias layer is achieved by depositing a thick hard bias seed layer, where an ion milling step is next conducted after the deposition of the thick seed layer to remove seed layer sidewall deposits from the side edges of the free magnetic layer. Thereafter, the hard bias layer is deposited on top of the thick seed layer immediately next to the side edges of the free magnetic layer. Improved free layer magnetic stabilization results from the improved positioning of the hard bias layer.

In an alternative embodiment, the thick hard bias seed layer is deposited, followed by the ion milling step to remove hard bias seed layer deposits from the sidewalls of the free magnetic layer. Thereafter, a thin second portion of the seed layer is deposited to provide a fresh crystallographic seed layer for the nucleation of the hard bias layer. Thereafter, the hard bias layer is deposited upon the thin second seed layer portion. The hard bias layer is positioned such that its midplane is coplanar with the midplane of the free magnetic layer, however there is a thin sidewall deposition of the second seed layer material that separates the hard bias layer from the side edges of the free magnetic layer. The thin sidewall deposition material can be optimized to improve the performance of the magnetic head.

It is an advantage of the magnetic head of the present invention that a head fabrication process has been developed to improve the free magnetic layer stabilization.

It is another advantage of the magnetic head of the present invention that a head fabrication process has been developed, where the midplane of the hard bias layer can be located at the same horizontal level as the midplane of the free magnetic layer.

It is a further advantage of the magnetic head of the present invention that a head fabrication process has been developed, where ion milling is applied to remove unwanted sidewall deposition portions of the hard bias seed layer, such that the hard bias layer is fabricated next to the side edges of the free magnetic layer.

It is an advantage of the hard disk drive of the present invention that it includes a magnetic head fabricated to improve the free magnetic layer stabilization.

It is another advantage of the hard disk drive of the present invention that it includes a magnetic head, in which the midplane of the hard bias layer is located at the same horizontal level as the midplane of the free magnetic layer.

These and other features and advantages of the present invention will no doubt become apparent to those skilled in the art upon reading the following detailed description which makes reference to the several figures of the drawings.

IN THE DRAWINGS

The following drawings are not made to scale of an actual device, and are provided for illustration of the invention described herein.

FIG. 3 is a side cross-sectional view depicting a magnetic head after completing the fabrication process of the GMR read head, as is known in the prior art;

FIGS. 4–6 are side cross-sectional views depicting a magnetic head during the fabrication process of the GMR read head of a first embodiment of the present invention;

DETAILED DESCRIPTION OF THE FIRST EMBODIMENT

Figure 1:
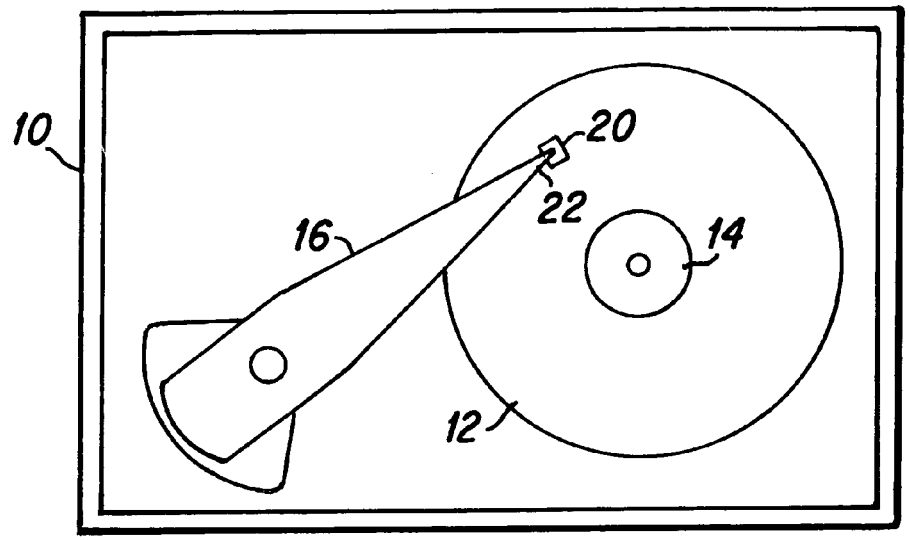
FIG. 1 is a top plan view generally depicting a hard disk drive including a magnetic head of the present invention.

FIG. 1 is a top plan view that depicts significant components of a hard disk drive 10. The hard disk drive includes an air bearing slider that includes a magnetic head 20 generally comprising an $Al_2O_3$—TiC substrate, the GMR read head of the present invention, and a write head. The hard disk drive 10 also includes a hard disk 12 on which a magnetic medium is deposited. The hard disk is rotatably mounted upon a motorized spindle 14. An actuator arm 16 is pivotally mounted within the hard disk drive 10 with the magnetic heads 20 disposed upon a distal end 22 of the actuator arm 16. A typical hard disk drive 10 may include a plurality of hard disks 12 that are rotatably mounted upon the motorized spindle 14 and a plurality of actuator arms 16 having magnetic heads 20 mounted upon the distal ends 22 of the actuator arms 16. As is well known to those skilled in the art, when the hard disk drive 10 is operated, the hard disk 12 rotates upon the motorized spindle 14 and the air bearing slider flies above the surface of the rotating hard disk 12.

Figure 2:
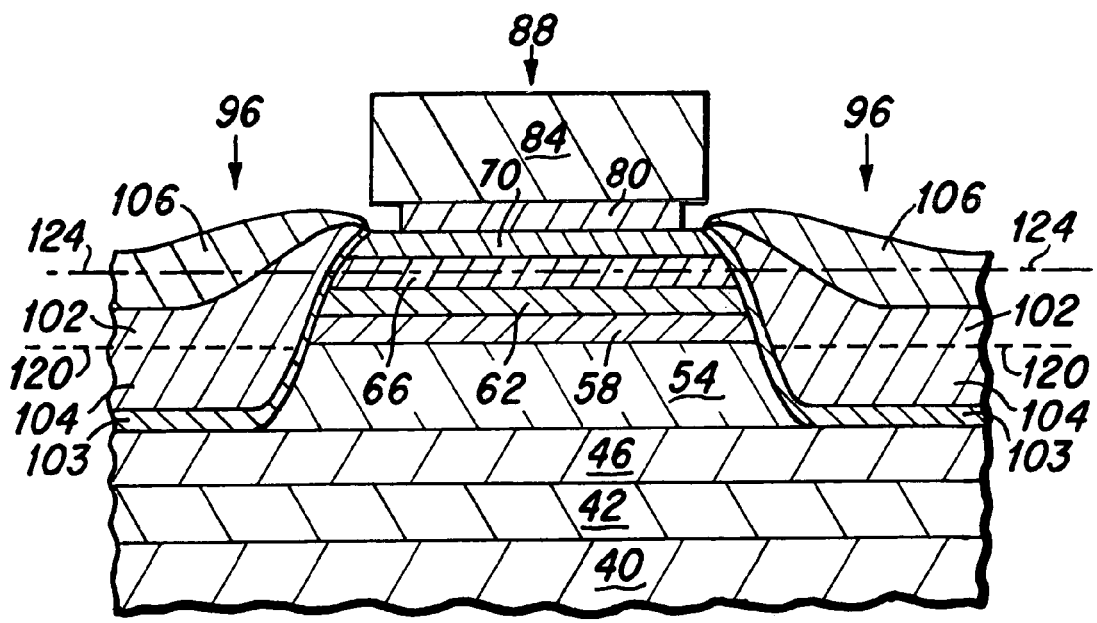
FIG. 2 is a side cross-sectional view depicting a magnetic head during the fabrication process of the GMR read head, as is known in the prior art.

FIG. 2 is a side cross-sectional view depicting a prior art magnetic head during the fabrication process of the GMR read head portion, as is known in the prior art, and FIG. 3 is a side cross-sectional view depicting the GMR read head of FIG. 2 after completing its fabrication process as is known in the prior art. This prior art fabrication process is improved upon in the present invention, and FIGS. 2 and 3 therefore serve as a suitable starting point for the description of this invention.

A wafer 40 used in the fabrication process typically comprises an $Al_2O_3$—TiC ceramic substrate 40 coated with an $Al_2O_3$ film (not shown). In the fabrication process, as is depicted in FIG. 2, a bottom magnetic shield layer ($S_1$) 42, typically formed of an approximately 1 μm thick Ni—Fe film, is deposited on the wafer 40. A bottom gap insulation layer ($G_1$) 46, typically formed of an approximately 10.6 nm thick $Al_2O_3$ film, is deposited on the $S_1$ layer 42. Thereafter, an antiferromagnetic pinning layer 54, typically comprised of an approximately 15 nm thick Pt—Mn, is then deposited on the G1 insulation layer. Thereafter, pinned magnetic layers 58, typically comprising an approximately 1.6 nm thick Co—Fe film, a 0.8 nm thick Ru film and a 1.8 nm thick Co—Fe film, are deposited on the antiferromagnetic layer 54. A spacer layer 62, typically formed of an approximately 2.0 nm Cu or Cu—O film, is deposited on the pinned layers 58. Thereafter, a free magnetic layer 66, typically formed of an approximately 2 nm Co—Fe film, is deposited on the spacer layer 62. A cap layer 70, typically comprised of an approximately 4 nm thick Ta film, is then deposited on the free magnetic layer 66.

After the layer depositions, bilayer photoresists, comprising a lower photoresist 80 and an upper photoresist 84, are then applied and exposed in a photolithographic tool to mask the GMR read sensor in the central read region 88 for defining a sensor width. The layers in unmasked side regions 96 are removed by ion milling until the $G_1$ layer 46 is exposed. The hard bias element structure 102, typically comprising an approximately 3 nm thick Cr seed layer 103 and a 30 nm thick Co—Pt—Cr layer 104, is then deposited onto the unmasked side regions 96. Thereafter, the electrical contacts 106, typically comprising an approximately 80 nm thick Rh film and a 5 nm thick Ta film, are also deposited also onto the unmasked side regions 96. With further reference to FIG. 3, the bilayer photoresists are then lifted off. Subsequently, the GMR read sensor is patterned for defining a sensor height, connected with a recessed electrical conductor (typically comprising a 3 nm thick Ta film, a 80 nm thick Cu film and a 3 nm thick Ta film), covered by a top gap insulation layer ($G_2$) 110 typically formed of an approximately 20 nm thick $Al_2O_3$ film, and a second magnetic shield layer ($S_2$) 114.

After the completion of this fabrication process of the GMR read head, the fabrication process of the write head is conducted using well known fabrication steps. After the completion of the fabrication processes of the GMR read and write magnetic heads, the heads are lapped along the alignment mark until designed sensor height and throat height are attained.

It is difficult for this prior art GMR read head to fully stabilize the free magnetic layer 66, due to the shadowing effects of the bilayer photoresists during the severe ion milling applied to the GMR read sensor in the unmasked side regions 96. The ion milling creates a trench down to the G1 layer 46 in the unmasked side regions, and thus the midplane 120 of the hard bias layer 104 deposited on the $G_1$ layer 46 within the trench is located far below the midplane 124 of the free magnetic layer 66. As a result, the desired hard bias layer thicknesses cannot be attained at the free magnetic layer side edges. Particularly, the Cr seed layer of the hard bias structure 102 is not thick enough to raise the level of the hard bias layer 104 such that the midplane 120 of the hard bias layer 104 would be at the same horizontal level as the midplane 124 of the free magnetic layer 66. While a thicker seed layer will bring the midplane 120 of the hard bias layer up to the midplane 124 of the free magnetic layer, it will also increase the amount of the deposited seed layer material on the sensor sidewalls 130. It has been determined that the thickness of the seed layer deposited on the shallow sensor sidewalls is typically approximately 50% of the seed layer material thickness deposited upon the wafer surface. Therefore, if a seed layer were deposited to a thickness of approximately 30 nm, it would result in a sidewall deposit of approximately 15 nm which will act as an unwanted spacer between the hard bias layer 104 and the side edges 130 of the free magnetic layer 66, thereby degrading the performance of the GMR sensor because the magnetic biasing effect of the hard bias layer decreases nearly exponentially with the separation distance between the hard bias layer and the free magnetic layer.

Figure 5:
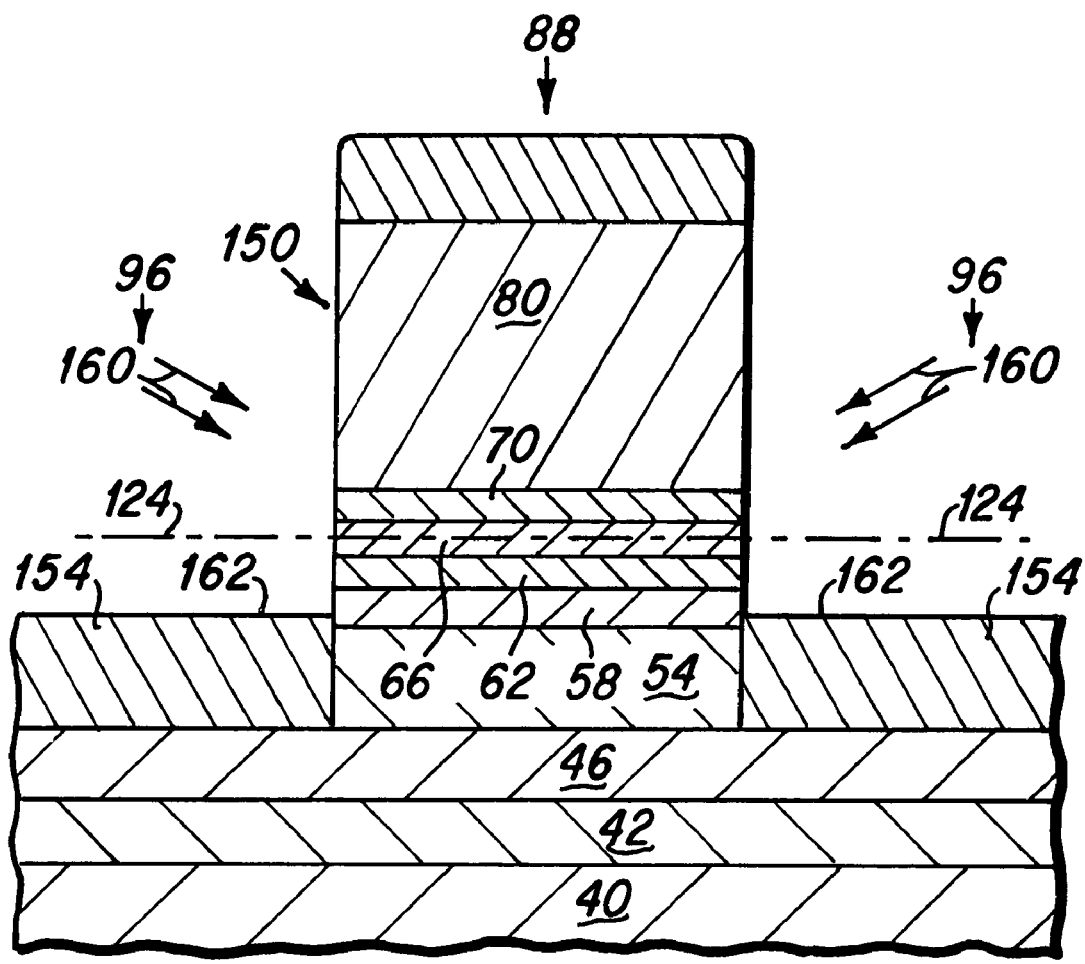
Figure 6:
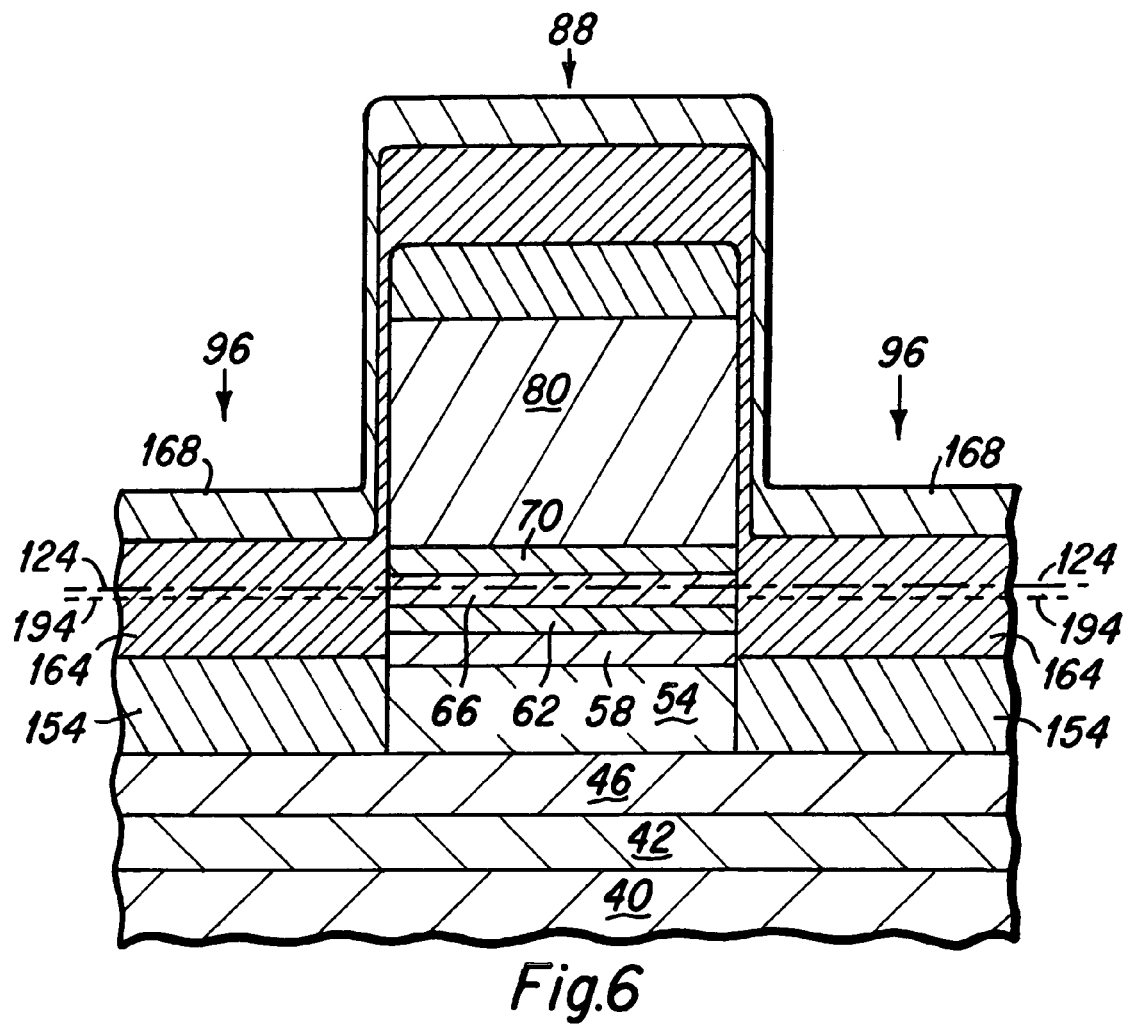
Figure 7:
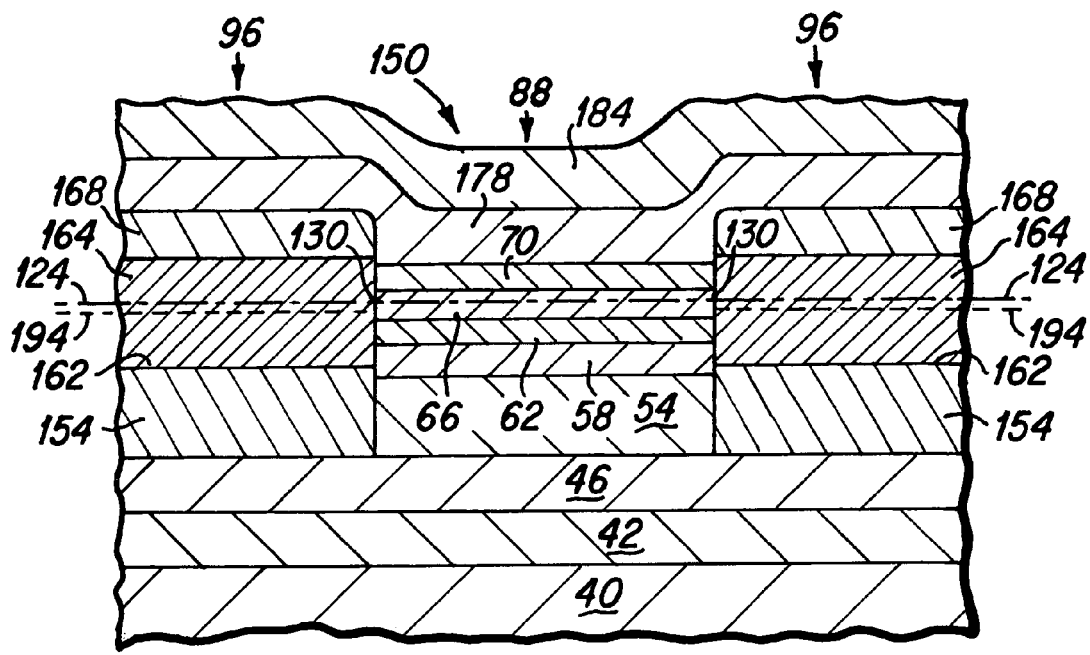
FIG. 7 is a side cross-sectional view depicting a magnetic head after completing the fabrication process of the GMR read head of the first embodiment of the present invention.

The present invention includes fabrication steps to solve these issues, and FIGS. 4–6 are side cross-sectional views, similar to FIG. 2, depicting a magnetic head 150 of the present invention during the fabrication process of the GMR read head, and FIG. 7 is a side cross-sectional view depicting the magnetic head 150 of the present invention after completion of the GMR read head fabrication steps. It is to be understood that the magnetic head of the present invention includes identical components with those depicted and described hereabove, and such identical components are identically numbered for ease of comprehension.

In the fabrication process, as is depicted in FIG. 4, an $S_1$ layer 42 and a $G_1$ layer 46, typically formed of a 1 μm Ni—Fe film and 10.6 nm thick $Al_2O_3$ film, respectively, are sequentially deposited on a wafer. Thereafter, a GMR read sensor, typically comprising Pt—Mn(15)/Co—Fe(1.6)/Ru (0.8)/Co—Fe(1.8)/Cu—O(2.0)/Co—Fe(1.5)/Ni—Fe(1.5) / Ta(4) films (thickness in nm), is then deposited on the $G_1$ layer 46. A photoresist 80 is then applied and exposed in a photolithographic tool to mask the GMR read sensor in a read region 88 for defining a sensor width. This step may require the use of known reactive ion etch (RIE) processing to define various photoresist materials. The read sensor layers in the unmasked side regions 96 are removed by ion milling until the G1 layer 46 is exposed, and the hard bias element structure of the present invention is then deposited onto the unmasked side regions 96. As depicted in FIG. 4, a thick seed layer 154 typically comprised of Cr or CrMo of approximately 30 to 40 nm and preferably about 35 nm is first deposited, and this results in a steep sidewall deposition 158 of approximately 8 to 10 nm. Following the deposition of the seed layer 154, as depicted in FIG. 5, a further ion milling step 160 is conducted at an angle of approximately 70° from normal to the wafer surface. As a result of the seed layer ion milling step 160, the unwanted sidewall deposition of seed layer material 158 is removed, and approximately 6 to 10 nm of the deposited seed layer thickness 154 is likewise removed. The remaining seed layer has an ion milled upper surface 162, and the thickness of the remaining seed layer is approximately 5 to 40 nm with a typical thickness of 25 to 30 nm.

Thereafter, as depicted in FIG. 6, the hard bias layer 164 is deposited, which may consist of an approximately 5 to 30 nm with a typical thickness of 15–20 nm thick Co—Pt—Cr layer. Thereafter, the electrical contacts 168, typically comprising Rh(80)/Ta(5) films, are deposited across the wafer and onto the hard bias layer 164 in the unmasked side regions 96. As is next seen in FIG. 7, the photoresist 80 along with material deposited upon it is removed, such as by using a chemical mechanical polishing step. Subsequently, the GMR read sensor is patterned for defining a sensor height, connected with a recessed conductor (preferably comprising a Ta(3)/Cu(80)/Ta(3) films), covered by a top gap $G_2$ layer 178 typically formed of an approximately 20 nm thick $Al_2O_3$ film, and a top shield layer ($S_2$) 184 typically formed of an approximately 1 µm thick Ni—Fe film is then deposited on the wafer. After photolithographic patterning of the $S_2$ layer into desired shapes and completing the fabrication process of the GMR read head, the fabrication process of the write head starts. After the completion of the fabrication processes of the GMR read and write heads, magnetic heads 150 are lapped along the alignment mark until designed sensor height and throat height are attained, and the magnetic head 150 of the present invention is completed.

As can be seen in FIG. 7, a first significant feature of the present invention is that the hard bias layer 164 is fabricated directly against the side edges 130 of the free magnetic layer 66 because the ion milling step 162 removed the sidewall deposits 158 of the seed layer 154. Additionally, the thick seed layer 154 raises the height of the hard bias layer 164, such that the midplane 194 of the hard bias layer 164 is generally horizontally aligned with the midplane 124 of the free magnetic layer 66. As a result, the GMR sensor of the magnetic head of the present invention has a stabilized free magnetic layer 66 which results in improved magnetic head performance characteristics. As will be understood by those skilled in the art, where the nature and/or thicknesses of the various sensor layers varies in differing magnetic heads, such that the height of the midplane 124 of the free magnetic layer above the G1 layer likewise varies, the thickness of the seed layer 154 should also be varied, such that the midplane 194 of the hard bias layer will be approximately coplanar (that is within 10 to 15 nm) with the midplane 124 of the free magnetic layer 66.

A concern that arises with the magnetic head 150 depicted in FIG. 7, is whether the ion milling of the surface 162 of the seed layer 154 will detrimentally affect its function as a seed layer in the nucleation the desired epitaxial growth of the Co—Pt—Cr hard bias layer, and an alternative embodiment of the present invention is next described with the aid of FIGS. 8–11.

Figure 8:
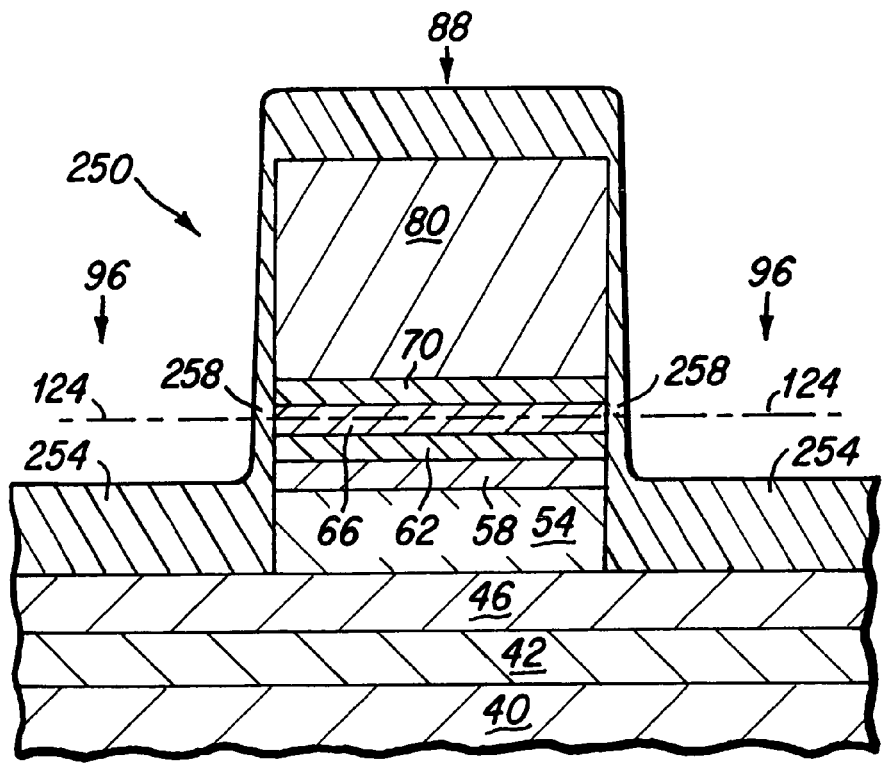
FIGS. 8–10 are side cross-sectional views depicting a magnetic head during the fabrication process of the GMR read head of a second embodiment of the present invention.
Figure 9:
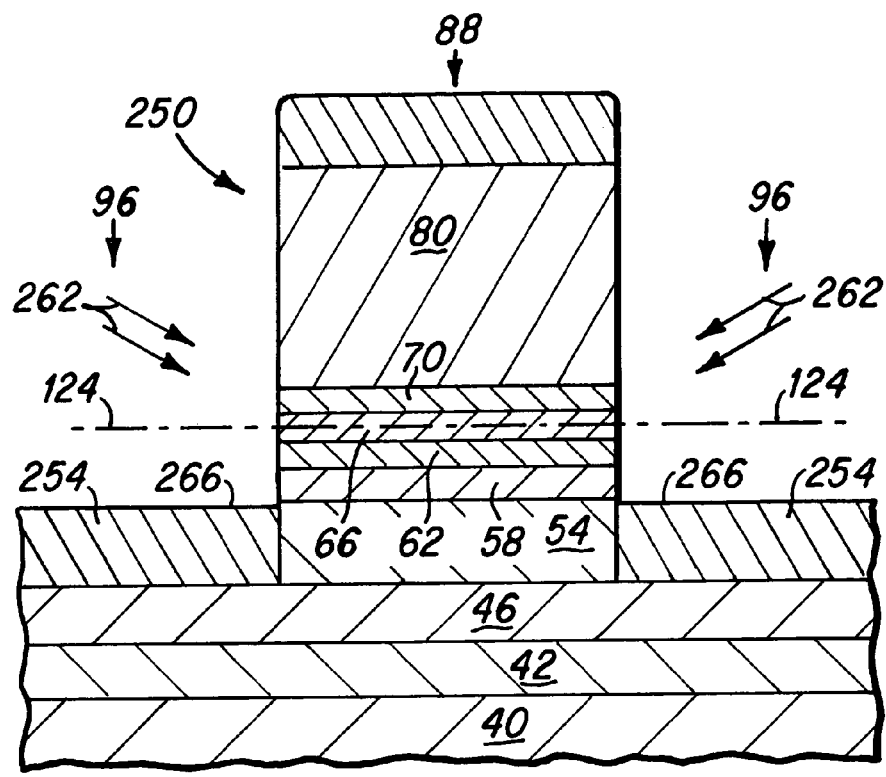
Figure 11:
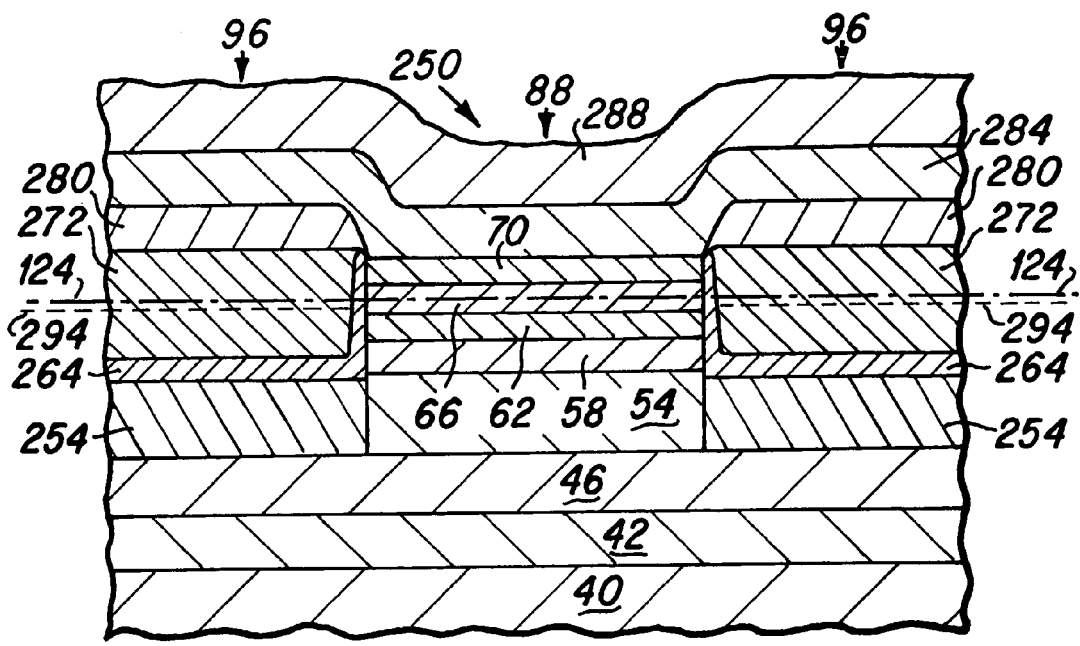
FIG. 11 is a side cross-sectional view depicting a magnetic head after completing the fabrication process of the GMR read head of the second embodiment of the present invention.
Figure 10:
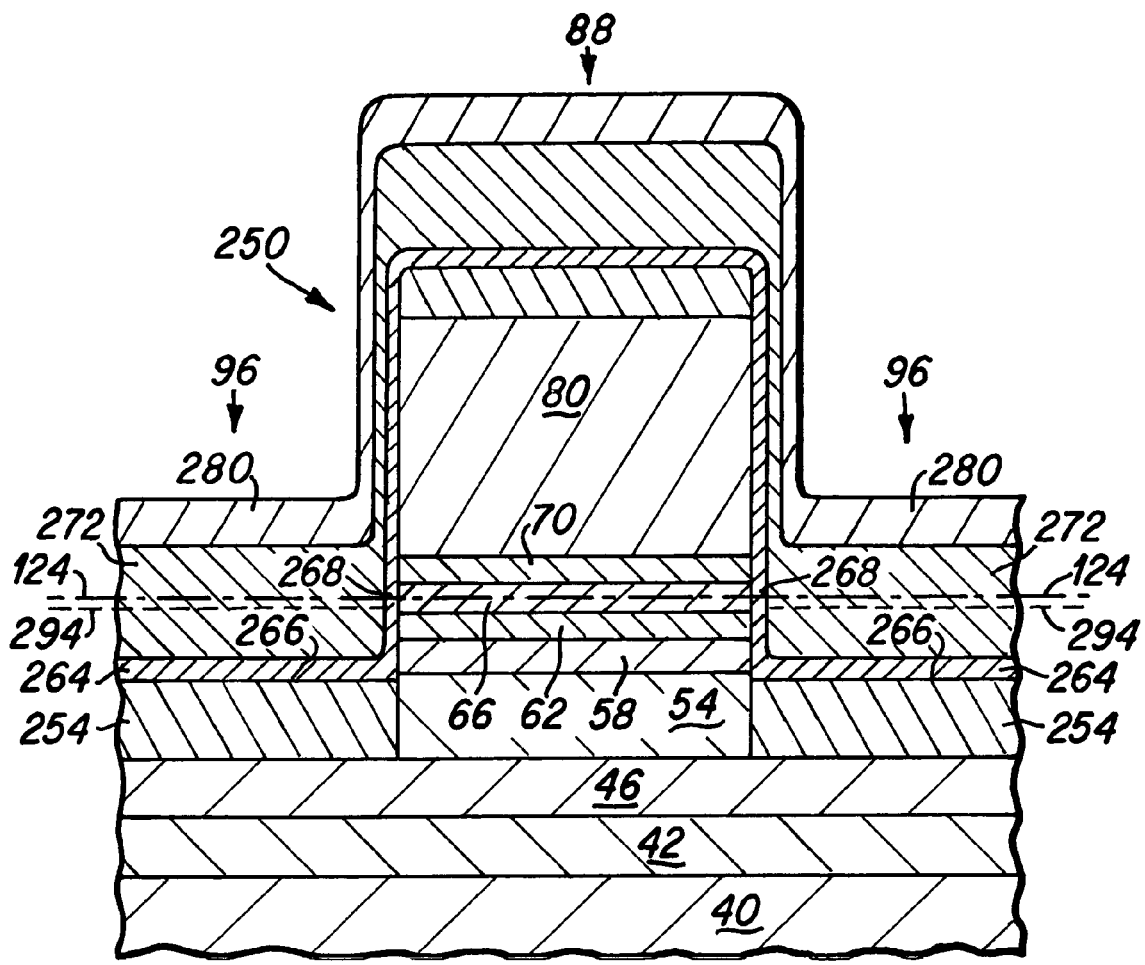

FIGS. 8–10 are side cross-sectional views, similar to FIGS. 4–6, depicting a magnetic head 250 of the present invention during the fabrication process of the GMR read head, and FIG. 11 is a side cross-sectional view depicting the magnetic head 250 of the present invention after completion of the GMR read head fabrication steps. It is to be understood that the magnetic head of the present invention includes identical components with those depicted and described hereabove, and such identical components are identically numbered for ease of comprehension.

In the fabrication process, as is depicted in FIG. 8, an $S_1$ layer 42 and a $G_1$ layer 46, typically formed of a 1 µm Ni—Fe film and 10.6 nm thick $Al_2O_3$ film, respectively, are sequentially deposited on a wafer. Thereafter, a GMR read sensor 214, typically comprising Pt—Mn(15)/Co—Fe(1.6)/Ru(0.8)/Co—Fe(1.8)/Cu—O(2.0)/Co—Fe(1.5) /Ni—Fe (1.5)/ 4) films (thickness in nm), is then deposited on $G_1$ layer 46. Bilayer photoresists, comprising a lower photoresist 80 and an upper photoresist 84, are then applied and exposed in a photolithographic tool to mask the GMR read sensor in a read region 88 for defining a sensor width. The read sensor layers in the unmasked side regions 96 are removed by ion milling until the G1 layer 46 is exposed, and the hard bias element structure of the present invention is then deposited onto the unmasked side regions 96. As depicted in FIG. 8, a relatively thick first portion of a seed layer 254, typically comprised of Cr or CrMo of approximately 25 to 30 nm is first deposited, and this results in a sidewall deposition 258 of approximately 6 to 8 nm. By way of comparison, the seed layer 254 is not as thick as the seed layer 154 of magnetic head 150. Following the deposition of the first seed layer portion 254, as depicted in FIG. 9, a further ion milling step 262 is conducted at an angle of approximately 70° from normal to the wafer surface. As a result of the seed layer ion milling step 262, the unwanted sidewall deposition of seed layer material 258 is removed, and approximately 4 to 6 nm of the seed layer thickness 254 is likewise removed.

As is next depicted in FIG. 10, a thin second portion 264 of the seed layer is next deposited upon the ion milled surface 266 of the first seed layer portion 254 after the ion milling step 262. The second seed layer portion 264 is as thin as is practical to provide a fresh seed layer crystalline orientation upon the milled surface 266 of the first seed layer portion 254. It is desirable that the thickness of the second seed layer 264 be only as thick as is minimally necessary for this purpose, such that the additional sidewall deposition 268, which will have a thickness of approximately 20 to 25% of the second seed layer thickness be held to a minimum. A typical thickness for the second seed layer 264 will be approximately 4 to 10 nm, such that the thickness of the sidewall deposition 268 will be only approximately 2 nm. In comparing the magnetic head embodiments 150 and 250 of FIGS. 6 and 10, it can be seen that the total thickness of the hard bias seed layer is approximately equal, however the seed layer structure of magnetic head 250 is formed with a fresh (not ion milled) crystallographic surface of the second seed layer portion 264, although it also includes a thin sidewall seed layer deposition 268.

Thereafter, as depicted in FIG. 10, the hard bias layer 272 is deposited upon the second seed layer 264, and it may consist of an approximately 20 nm thick Co—Pt—Cr layer.

Thereafter, the electrical contacts 280, typically comprising Rh(80)/Ta(3) films, are deposited onto the hard bias layer 272 in the unmasked side regions 96. As is next seen in FIG. 11, the bilayer photoresists are then lifted off. Subsequently, the GMR read sensor is patterned for defining a sensor height, connected with a recessed conductor (typically comprising a Ta(3)/Cu(80)/Ta(3) films), covered by a top gap $G_2$ layer 284 typically formed of an approximately 20 nm thick $Al_2O_3$ film, and a top shield layer ($S_2$) 288 typically formed of an approximately 1 μm thick Ni—Fe film is then deposited on the wafer. After photolithographic patterning of the $S_2$ layer into desired shapes and completing the fabrication process of the GMR read head, the fabrication process of the write head starts. After the completion of the fabrication processes of the GMR read and write heads, magnetic heads 250 are lapped along the alignment mark until designed sensor height and throat height are attained, and the magnetic head 250 of the present invention is completed.

As can be seen in FIG. 11, a significant feature of the magnetic head 250 of the present invention is that the thick seed layer, composed of the first seed layer portion 254 and the second seed layer portion 264, raises the height of the hard bias layer 272, such that the midplane 294 of the hard bias layer 272 is generally horizontally aligned with the midplane 124 of the free magnetic layer 66. As a result, the GMR sensor of the magnetic head 250 of the present invention has a stabilized free magnetic layer 66 which results in improved magnetic head performance characteristics.

While the present invention has been shown and described with regard to certain preferred embodiments, it will be understood that those skilled in the art will no doubt develop certain alterations and modifications thereto which nevertheless include the true spirit and scope of the invention. It is therefore intended that the following claims cover all such alterations and modifications.

What is claimed is:

1. A method for fabricating a magnetic head comprising:

fabricating a plurality of thin film layers to create a read sensor, said read sensor including a first insulation (G1) layer, a pinned layer, a pinning layer, a spacer layer, a free magnetic layer having a midplane thereof, and a cap layer;

milling said plurality of thin films such that a central sensor region is protected from milling and unprotected outer regions are milled down to said G1 layer, such that said free magnetic layer is formed with a central portion and outwardly disposed side edge portions;

fabricating a hard bias structure upon said G1 layer at said outer regions such that said hard bias structure is disposed proximate said side edge portions of said free magnetic layer, said hard bias structure including a seed layer and a hard bias layer, wherein said hard bias structure is fabricated by;

depositing said seed layer upon said G1 layer;

removing an upper portion of said seed layer to create an upper surface of said seed layer;

depositing hard bias material upon said upper surface of said seed layer to create said hard bias layer that is disposed upon said seed layer; and wherein said hard bias layer has a midplane that is disposed at a horizontal level within the magnetic head that is approximately coplanar with said midplane of said free magnetic layer.

2. The method for fabricating a magnetic head as described in claim 1 wherein said hard bias layer is deposited next to said side edge portions of said free magnetic layer.

3. The method for fabricating a magnetic head as described in claim 2 wherein said seed layer has a thickness of approximately 25–30 nm, and wherein said hard bias layer has a thickness of approximately 15–20 nm.

4. The method for fabricating a magnetic head as described in claim 3 wherein said removing of said upper surface of said seed layer includes ion milling said seed layer.

5. The method for fabricating a magnetic head as described in claim 1 wherein said seed layer is formed with an initial thickness of approximately 30–40 nm, said upper portion of said seed layer is approximately 6–10 nm thick, such that a final thickness of said seed layer is approximately 25–30 nm.

6. The method for fabricating a magnetic head as described in claim 1 wherein said seed layer is comprised of Cr or CrMo, and said hard bias material is CoPtCr.

* * * * *